Oct. 17, 1967  C. A. CRAFTS ETAL  3,348,149
SERIAL TO DIPLEX CONVERSION SYSTEM
Filed May 24, 1963  8 Sheets-Sheet 1

INVENTORS
CECIL A. CRAFTS
ROBERT L. CARLSON
BY
Browne, Schuyler and Beveridge
ATTORNEYS Oct. 17, 1967

C. A. CRAFTS ET AL 3,348,149

SERIAL TO DIPLEX CONVERSION SYSTEM

Filed May 24, 1963

INVENTORS
CECIL A. CRAFTS
ROBERT L. CARLSON
BY

ATTORNEYS

INVENTORS
CECIL A. CRAFTS
ROBERT L. CARLSON
BY Browne, Schuyler and Beveridge
ATTORNEYS Oct. 17, 1967   C. A. CRAFTS ET AL   3,348,149
SERIAL TO DIPLEX CONVERSION SYSTEM
Filed May 24, 1963   8 Sheets-Sheet 8

INVENTORS
CECIL A. CRAFTS
ROBERT L. CARLSON

Browne, Schuyler and Beveridge
ATTORNEYS

United States Patent Office 3,348,149
Patented Oct. 17, 1967

3,348,149
SERIAL TO DIPLEX CONVERSION SYSTEM
Cecil Annand Crafts, Santa Ana, and Robert L. Carlson, Fullerton, Calif., assignors to Robertshaw Controls Company, Richmond, Va., a corporation of Delaware
Filed May 24, 1963, Ser. No. 283,045
14 Claims. (Cl. 325—30)

This invention relates generally to transmission and reception of high speed data streams by angular modulation of a carrier wave. It relates more particularly to reduction of the required band width at a communication frequency for transmitting a given number of bits per second through diplexing, or simultaneous modulation of the carrier by two sets of digital signals resulting in different amounts of phase shift, thereby to reduce the required keying rate to one-half the simplex keying rate.

Data transmission systems employing digital amplitude or frequency-shift methods are well-known in the art. Phase shift keying systems have been more recently recognized for their high data rates under given conditions and because of the superior signal-to-noise ratio obtained. A number of patents and disclosures have indicated this development which forms background for the present invention. Superior results obtained by these phase shift-keying systems permit the use of a narrow band width about a fixed frequency communication wave, for that particular channel, which is essentially determined by the rate of keying required to incorporate discrete phase modulations in the wave and is equal to the number of bits of information per second at the chosen communication bit rate. Thus, the 1200 bit per second transmission rate requires a keying rate of 600 cycles per second, or a band spread about the frequency selected of not less than 1200 cycles per second. This requires a separation of neighboring channels within the frequency spectrum of somewhat over 1200 cycles per second.

In any practical system, frequency crowding is critical and the availability of frequencies in the spectrum ultimately becomes a limiting factor on the amount of information which may be communicated. Accordingly, any reduction in the band width for any particular channel and bit rate permits a proportionate increase in system capacity.

It is an object of this invention to provide a system for communicating high speed digital information as a phase keyed signal in which the resulting band width is reduced substantially by one-half.

A further object is to provide automatic means in a transmitter unit for converting a high bit rate signal into two parallel streams each containing half of the information, and for applying these streams simultaneously as differing multiples of a fixed phase shift of a carrier or subcarrier frequency in a keyed shift system.

Another object is to provide a receiver unit responsive to a diplex transmitter unit for reconverting a pair of parallel data stream into a serial data stream.

A still further object of the invention is to provide a transmitter unit for shifting the phase of a transmitted wave of given frequency in four steps of shift such that only half the number of shifts per second is required as compared to the number of bits per second transmitted.

Still another object of the invention is to provide a multi-channel-synchronous system in which repeated mark or space signals may be indicated at the receiver without the separate transmission of a clock signal, which is derived from the carrier.

To achieve these objectives applicants take a high bit rate data stream such as at 1200 bits per second and a related clock signal at the transmitter, and employ these signals by pulse gate processing techniques to produce on four output lines unidirectional pulses so disposed that at a rate equal to one-half the bit rate of the information signal there is one and only one pulse on the aggregate of the four lines but is a signal indicative of a desired phase shift to be applied to the transmitted wave. By way of illustration, these signals may be employed on four separate lines as in patent application Ser. No. 69,878, filed Nov. 17, 1960, now Patent No. 3,157,740 wherein the magnitude of phase shift of the carrier is ordered by selecting the line on which the signal thus divided out may occur. Logic circuitry for combining the outputs to produce the desired shift of carrier wave has previously been disclosed. Recombining the diplexed stream of information signals to produce the original input serial data stream is accomplished in the receiver unit analogously to the serial-to-diplex conversion of the transmitter.

These and other objects of the invention will be more readily understood by reference to the drawings in which.

Figure 1:
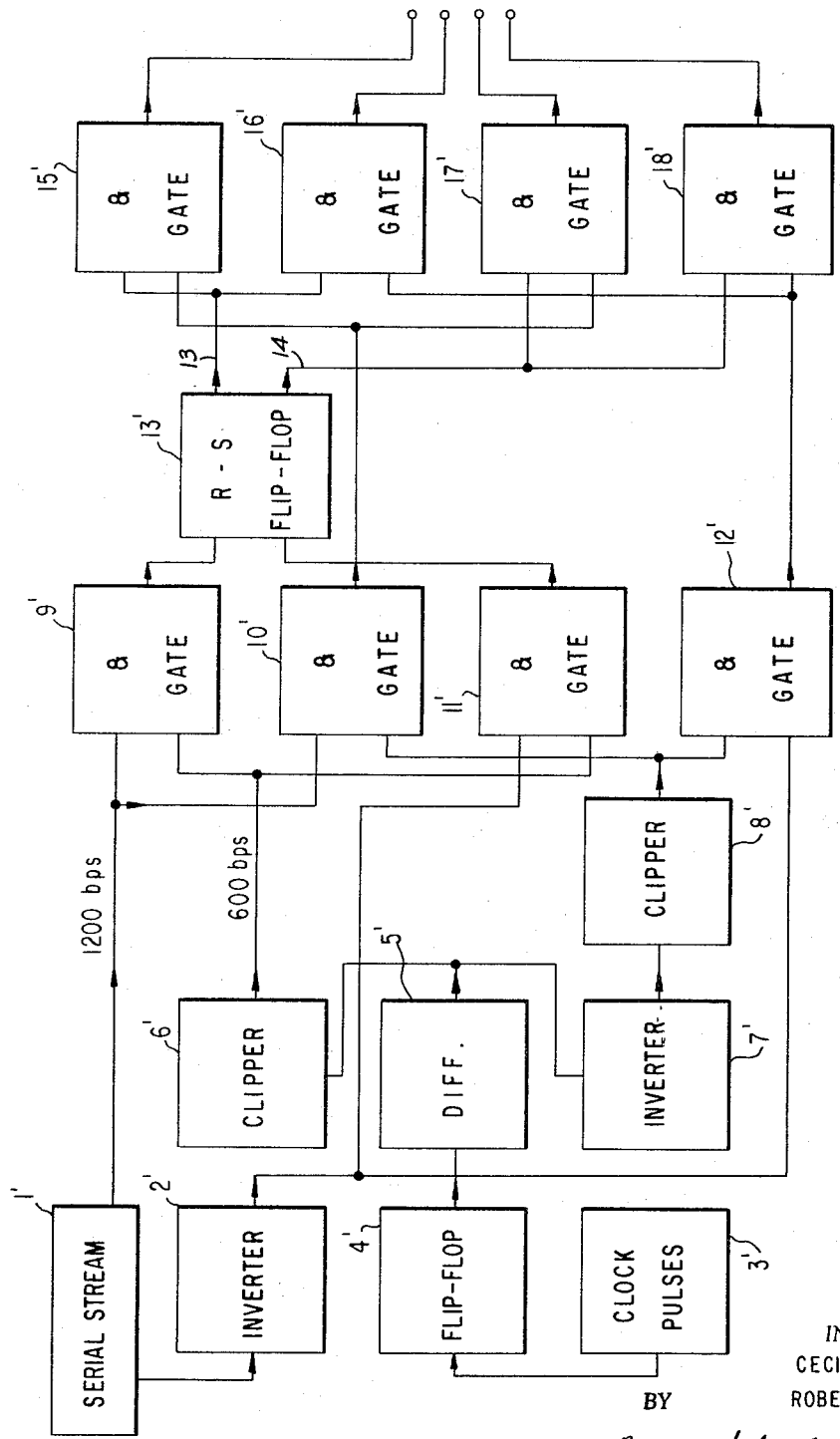
FIG. 1 is a block diagram of a serial-to-diplex transmit unit.

Proceeding now to a more detailed description of the invention block diagrams of the operation will be explained by reference to wave form diagrams hereinafter referred to as line 1, line 2 . . . line 50 or simply as outputs or waveforms 1, 2 . . . 50 of FIG. 2 and FIG. 7. A stream of two-level data signals occurring, for example, at 1200 bits per second, is illustrated by wave form 1 of FIG. 2, from a data source 1' of FIG. 1. The serial data stream from source 1' is employed directly as in waveform 1 shown at line 1, FIG. 2 and is also inverted by an inverter 2' to give a waveform identical with the output 1 except reversed in phase, and therefore shown inverted as wave form 2 of FIG. 2. A clock-pulse is provided to form the fundamental timing wave of the system, derived from a suitable source indicated at 3' having an output as in line 3 of FIG. 2, fed to a flip-flop circuit 4' of conventional type having opposite polarities of D.C. output for alternate like input signals from the clock-pulse source. The clock-pulse at 3 of FIG. 2 is commonly controlled with the data stream such that the clock pulses are synchronous with, and occur at approximately the center of, information bits of the data stream, there being one clock-pulse during each "unit pulse" of the data stream. Conventional means, not shown, may be employed to synchronize clock and data pulses as desired, as in multiplexing to provide synchronism between the key shift operations of the channels.

The flip-flop 4' has an output illustrated at 4 of FIG. 2 which is fed to a differentiator 5' for the purpose of producing pulses coincident with the clock pulses but in which each alternate pulse is of reversed polarity as illustrated in line 5 of FIG. 2. Two output portions from differentiator 5' are taken one to a rectifier or clipper circuit 6', whose purpose is to remove the negative-going pulses (or the positive-going pulses in a negative pulse system) of the output from the differentiator. The second output of the differentiator is passed through an inverter 7' to produce an inversion of the output of differentiator 5' as illustrated in line 7 of FIG. 2. This series of pulses is clipped by clipper 8' in the same manner as the pulses 5 in clipper 6' to produce an output as in line 8 of FIG. 2 which is in all respects like line 6 except that the pulses are intermediate in time between the pulses in line 6.

Data stream 1 from source 1' is fed directly to a pair of like AND gates 9' and 10' and data stream 2, which is the inversion of data stream 1, is passed to similar AND gates 11' and 12', these being the "first input" to gates 9' through 12', respectively. The pulse stream 6 is then supplied to one pair of AND gates such as 9' and 11' of which one receives the data stream 2. Likewise, the pulse stream 8 is supplied to the remaining pair of AND gates 10' and 12', one being also supplied with the data stream 1 and the other with data stream 2. It will be observed that gate 9' produces an output as illustrated in line 9 of FIG. 2 when a positive signal from data stream 1 coincides with one of the pulses 6 which represents, for example, the positive signal from differentiator 5'. Gate 10' likewise produces an output when a positive portion of the data stream 1 coincides with a negative signal from differentiator 5' obtained by inverting the output thereof and clipping the negative therefrom to produce the positive gating signal required to cooperate in gate 10', to produce an output as illustrated in FIG. 2, line 10. Similarly, gate 11' responds to the inverted data stream signal 2 when the output of clipper 6' is a positive signal, while gate 12' responds to positive signals from the inverter 2' which are coincident with positive signals from the clipper 8'. The outputs from these gates are shown, respectively, at lines 9, 10, 11 and 12.

A reset flip-flop 13' is illustrated as having two inputs one receiving the signal in line 9 and the other the signal in line 11. It will be obvious that gates 9' and 11' may not be simultaneously operated since each AND gate must have two positive signals to produce an output and because gates 9' and 11' are fed first inputs from oppositely phased data streams 1 and 2. However, both gates 9' and 11' are fed at the same instant with positive signals of line 6 derived from one or the other of the alternate sets of clock signals, here illustrated as the positive signals shown in line 5. Thus, the only outputs in line 9 are initiated by positive signals 6 occurring during positive voltages in stream 1. Similarly, AND gate 11' has an output 11 which occurs only in response to coincidence of a positive portion of curve 2 with a positive pulse of line 5 or 6. Gates 10' and 12' have one of their inputs supplied in common from the pulses 7 (inverted pulses 5) after the negative portions are deleted, such that gates 10' and 12' have their input energized during unit pulses alternating with the energization of the corresponding input of gates 9' and 11'. These gates are supplied one from the serial stream 2 to produce at 10 and 12 coincidence outputs, determined as described, so that no signal in line 10 coincides with a signal in line 12 and no pair of successive signals in combined lines 10 and 12 occurs oftener than half the bit rate, as is also true of signals in lines 9 and 11.

Figure 9:
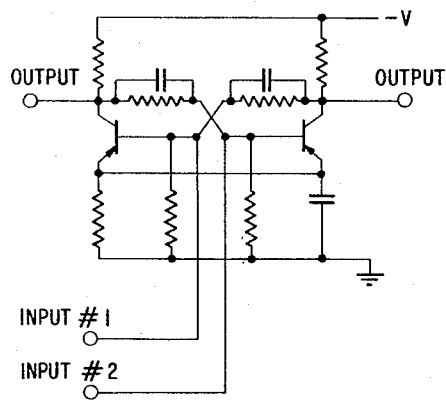
FIG. 9 illustrates a reset flip-flop employable herein.

The reset flip-flop 13' has two outputs according to well-known practice, as illustrated in FIG. 9. These outputs are opposite in phase, and either line 13 or 14 will be energized at any instant for the reason that such a flip-flop circuit is "on" at one output thereof whenever the opposite output is "off." Thus, when a positive voltage occurs in line 13 as a result of a positive pulse in line 6, coinciding with a positive in line 1, the positive voltage will be retained in line 13 until such time as a pulse is produced in line 11 to reset the flip-flop 13'. When this happens, line 14 will have the positive output and the positive output at line 13 will be discontinued. Line 11, however, has a pulse only when the voltage in line 2 is positive and when the line 6 has a positive pulse. Likewise, line 12 has an output pulse during positive portions of the signal on line 2 and when pulses occur on line 8 in response to inverted positive signals from the differentiator 5'.

Signal outputs from 13' are taken as the first inputs for four AND gates 15', 16', 17' and 18' wherein gates 15' and 16' have a first input signal when line 13 is positive and gates 17' and 18' have a first input when line 14 has a positive signal. The second input for gate 15' is present when line 1 is positive and line 8 is positive in consequence of the alternatively negative excursions of voltage in line 4, each being an alternate one of the initial clock signals. These same alternate clock signals produce the second input for gate 18' whenever they are coincident with positive voltages in line 2, provided line 8 has signal output at that time. The combined output from positive signals in lines 2 and 8 (line 12) is also fed as the second input signal to the gate 16', which has a first input as in line 13. Gate 17' responds to the fourth possible condition in which lines 10 and 14 are both positive at the same time. Each of gates 15' to 18' has a corresponding output illustrated at 15, 16, 17 and 18, respectively, which are utilized as input for a logic circuit employed to gate the transmitter output according to the selected four differing amounts of phase or frequency modulation to be transmitted.

Upon further reference to FIG. 2 the situation required to initiate positive output in line 13 is seen to be a positive output in line 1, combined with a member of the first-mentioned half-rate positive pulses produced in consequence of the first-mentioned series of alternate clock pulses in line 6, this combination being as shown in line 9. Four such trigger pulses in line 9 are shown, of which only two effect a change inasmuch as line 13 is already positive at the time of occurrence of the second and third positive signals. Line 13 may be triggered "off" only in response to a positive signal in line 11, of which six are shown, five of these occurring while line 13 is already negative and are therefore not effective to change the level of signal in line 13.

The signal in line 14 is the mirror image of that in line 13 due to the construction of conventional reset flip-flop circuits as illustrated in FIG. 9. Signals in lines 10 and 12 are effective to produce outputs in lines 17 and 18 whenever the signal output in line 14 is positive and to produce outputs in lines 15 and 16 whenever the output in line 13 is positive, thus to complete the representation in one or another of the lines 15 to 18 each of the possibilities presented on comparing an alternate one of the clock signals with the data stream of line 1, thereby to effect a complete transmission of a four-level signal at half the bit rate of the binary signal from which it was produced.

It will be understood that a transmitter for signals of this type may take several forms, of which that disclosed in co-pending application Ser. No. 69,878 is an example, with a desirable modification as in FIG. 3 hereof to provide from 3' a clock signal occurring at 1200 pulses per second which is converted to square wave form by flip-flop 4' and doubled in frequency in doubler 108', and converted to a normal sine wave by filter 108, or suitable resonant circuitry. It is then employed as the tone or carrier wave to be modulated. Such a carrier wave is thus derived from, or otherwise definitely associated in timing with, the clock pulse employed for synchronizing between channels the phase shifting of the transmitter. It will be appreciated that a keyed phase shift may occur at any desired portion of the carrier wave, such as at the axis crossing, thereby to produce a signal of simpler form and readier resolution when received by the receiver unit.

Figure 3:
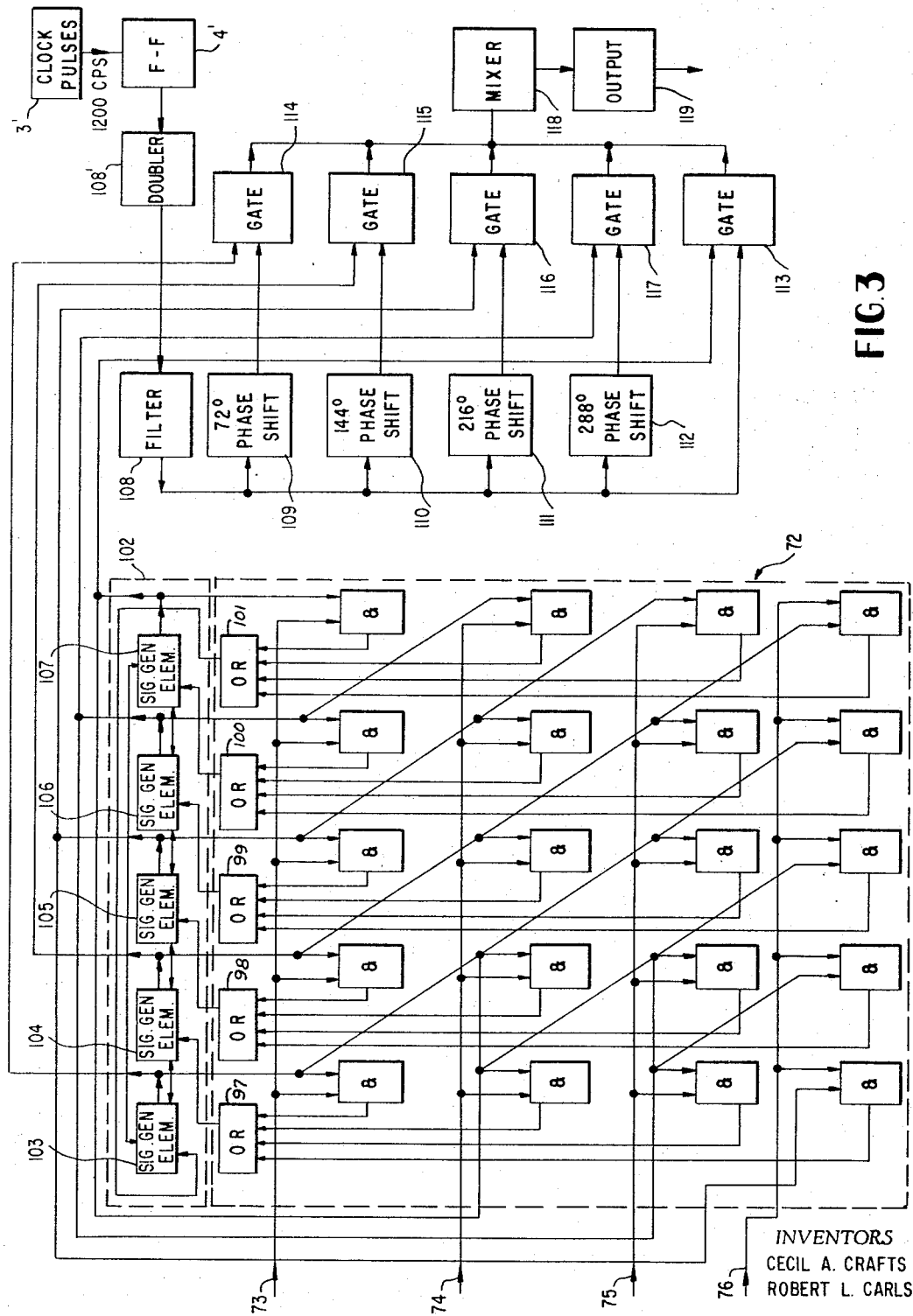
FIG. 3 is a block diagram of the transmitter signal generator and phase selecting logic responsive to the respective outputs of FIG. 1.

The above-mentioned co-pending patent application describes in detail the operation of a logic circuit for converting information signals presented to four terminals 73, 74, 75 and 76 into different phase shift increments of a single carrier wave derived preferably from the fundamental clock pulse source. An input signal at 73 will cause the output signal to change by a single increment (72°), and signals at 74, 75 and 76 by double, triple and quadruple increments (144°, 216° and 288°), respectively. The logic is illustrated in FIG. 3 hereof at 72 as consisting essentially of a number of diagonally-connected AND circuits arranged as in the prior application in a matrix having rows equal to the number of inputs and columns equal to the number of increments of phase of the carrier selectable by the transmitter as the instant output signal. The OR circuits illustrated are individually associated with the columns and have inputs from each of the several rows of the associated column one from each AND circuit of the column. OR circuits 97, 98, 99, 100 and 101 thus serve as five outputs of the logic matrix. A modified ring gate signal generator comprising signal generator elements 103, 104, 105, 106 and 107 is connected to move from one actuated position to another in response to a signal output from one of the OR circuits. An OR circuit corresponding to the selected logic function of a particular column determines which signal generating element shall have an output. As described in connection with the above-mentioned application only one signal generator element has an output at each instant, and a shift from one to another of these elements is governed by which one of the lines to terminals 73, 74, 75 or 76 is pulsed from lines 15, 16, 17 or 18.

Output gates 114, 115, 116, 117 and 113 serve as the selecting gates for setting the particular phase to correspond with the magnitude of phase shift ordered in one of the lines 15–18 to actuate the logic circuit. Phase shifting circuits 109, 110, 111 and 112 are conventional means for providing increments of phase from a fundamental frequency passing through filter 108 to be selected to effect the ordered phase increment. A wave of doubled frequency (2400 c.p.s.) passes to gate 113. The same wave is passed by circuit 109 retarded (or advanced) by the angle $\phi$ assumed here to be a single increment of 72°. In the circuit 110 the wave has a phase differing from that coming from filter 108 by $2\phi$ and in circuits 111 and 112 this wave is presented in phases altered by $3\phi$ and $4\phi$, respectively, taken in the same direction. These five phases are all presented for transmission to the gates 113–117. Only one of these gates is actuated at any instant by an output signal from the signal generator 102. The outputs from gates 113–117 are combined in mixer 118 and transmitted to the line or radio circuit by means of an output circuit 119, which is thereby phase shifted in steps according to which of the terminals 73–76 is instantly provided with an input signal.

Any stable source of sine wave might be employed as the carrier, and the clock signal may be derived from it. As illustrated in FIG. 3 the sine wave is derived from a stable clock pulse source 3' at the frequency of the desired information keying rate or the bit rate. A 1200 c.p.s. clock pulse source is thus converted into 2400 c.p.s. wave suitably filtered at filter 108 to provide the carrier wave. The clock pulses may operate to generate a square wave of 1200 c.p.s. as by triggering a flip-flop 4' which is then doubled as by differentiating, inverting, adding and shaping to form a 2400 c.p.s. square wave to filter 108, or the clock signal may otherwise initiate the filtered 2400 c.p.s. wave.

The important feature thus far described provides means and method by which bits of information occurring at 1200 per second are incorporated in a carrier wave by phase shifts occurring at the rate of 600 phase shifts per second. If the carrier frequency is 2400 c.p.s. not more than four cycles of carrier tone could be employed in the registration at the receiver of any particular shift of phase. It should also be noted that the absolute phase transmitted in any instant is of no importance inasmuch as the information is transmitted as increments or amounts of phase shift.

A signal transmitted as described consists in a single tone such as a sine wave of 2400 c.p.s., and it will be appreciated that the described manner of modulating this wave operates equally well for positive and negative phase shifts taken in appropriate order. There is no return to a zero or reference phase which is recognizable in the transmitted wave. It is convenient to refer to this signal as comprising shifts of 72°, 144°, 216° and 288° rather than shifts of plus or ±72° and ±144°, but inspection of the output wave would show no distinction between +288° and −72°, or between +144° and −216°.

Various sequences of input data may be employed such as computer data and data for a number of other purposes which may consist of repeated mark signals on any particular line or repeated space signals, or combinations thereof. It is thus desirable in processing signals from simplex mark and space signals to form diplex mark and space signals according to this invention to be able to send repeated mark-mark, space-space, mark-space or space-mark signals, in order that no restrictions shall be placed on the sequence of mark and space signals in the serial stream or in either channel as combined in the transmitted signal.

In such a system it becomes necessary to resolve the transmitted signals by reference to an arbitrary standard at the receiver which corresponds to a similar standard at the transmitter. One means of doing this has previously been disclosed for the transmission of phase locked signals in which the recovered phase is an indication of an absolute phase change from the zero phase at the transmitter.

The present invention employs a different principle in which the locking of transmitter and receiver phases is not needed. Also no synchronizing signal need be sent to indicate the length of the "unit pulse" employed in the transmission, needed at the receiver to determine the number of adjacent intervals of like transmission as in mark, mark, mark as a sequence. For this purpose a clock signal is directly derived in the receiver unit by this invention. By employing a unit pulse length equal to the reciprocal of the number of bits per second to be sent, and producing at the transmitter a timing pulse of the same repetition rate, according to the apparatus as described, it is possible to reproduce at the receiver a similar clock pulse without actual transmission thereof. This is possible when the clock frequency is a submultiple of the tone or carrier frequency and when the number of discrete phases employed times the carrier frequency is the multiple frequency generated in the receiver for producing an unmodulated wave of the carrier frequency used for phase demodulating the signal at each clock pulse. The clock pulse could be transmitted in another channel adjacent to the signal tone employed for phase modulation in those circumstances in which this extra channel width is permissible. For many purposes such use of extra band width is not permissible, and the frequency carrying the phase modulations may be employed at the receiver to generate a reference frequency which is the multiple of the phases used times twice the clock frequency such that it may be synchronous with each of the voltage peaks in the received tone regardless of its modulation into the several phases transmitted.

For convenience of reference the oscillation rate for complete cycles of a carrier wave or of a symmetrical square wave will be generally stated in cycles per second or c.p.s. while other pulse rates may be expressed in pulses per second p.p.s. while b.p.s. refers to information binary digits per second.

Long distance radio transmission will operate on the five phase mode for diplexed binary signals if phase identity is not attempted and there is used instead a *phase shift* which is a multiple of the increment 72°. A single shift is noted at the receiver as a shift from one to the next of the phases coincident in voltage peaks with the quintuple frequency wave developed at the receiver from the phase modulated carrier received. A second signal would be a *phase shift* increment of 144° and registers as a double shift regardless of any lack of synchronism between received and transmitted waves. There are thus four recognizable amounts of phase shift which are $\phi$, $2\phi$, $3\phi$ and $4\phi$, the value $5\phi$ being the same as no shift since $5\phi = 360°$.

Some other multiple than 4 might also be used within the scope of this invention, such as again dividing by 2, or with suitable modifications dividing by another factor than 2, and by changing the phase increment to employ N like increments of phase shift between $N+1$ like phase positions in a carrier cycle. A keying rate of half the frequency of a higher frequency carrier could be employed by use of a six or eight level phase modulation, N then haing the value 6 or 8, without increasing the band width in proportion to the additional information sent. Practical and theoretical difficulties limit the usefulness of smaller phase angle increments. N is illustratively 4 through this application.

Figure 4:
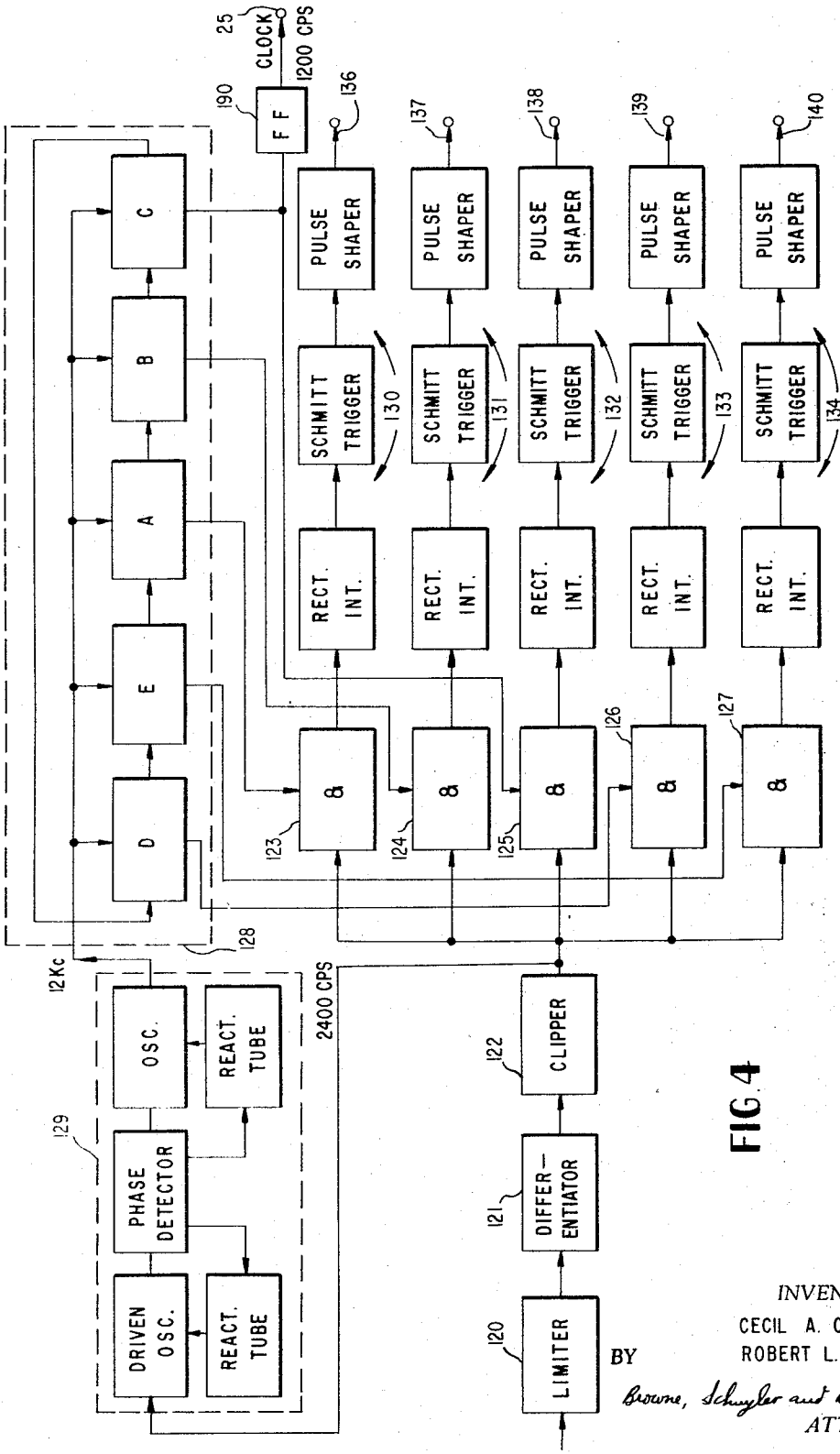
FIG. 4 is a block diagram of the input portion of a receiver connected to the output of FIG. 3 to supply phase shift data to be resolved.
Figure 5:
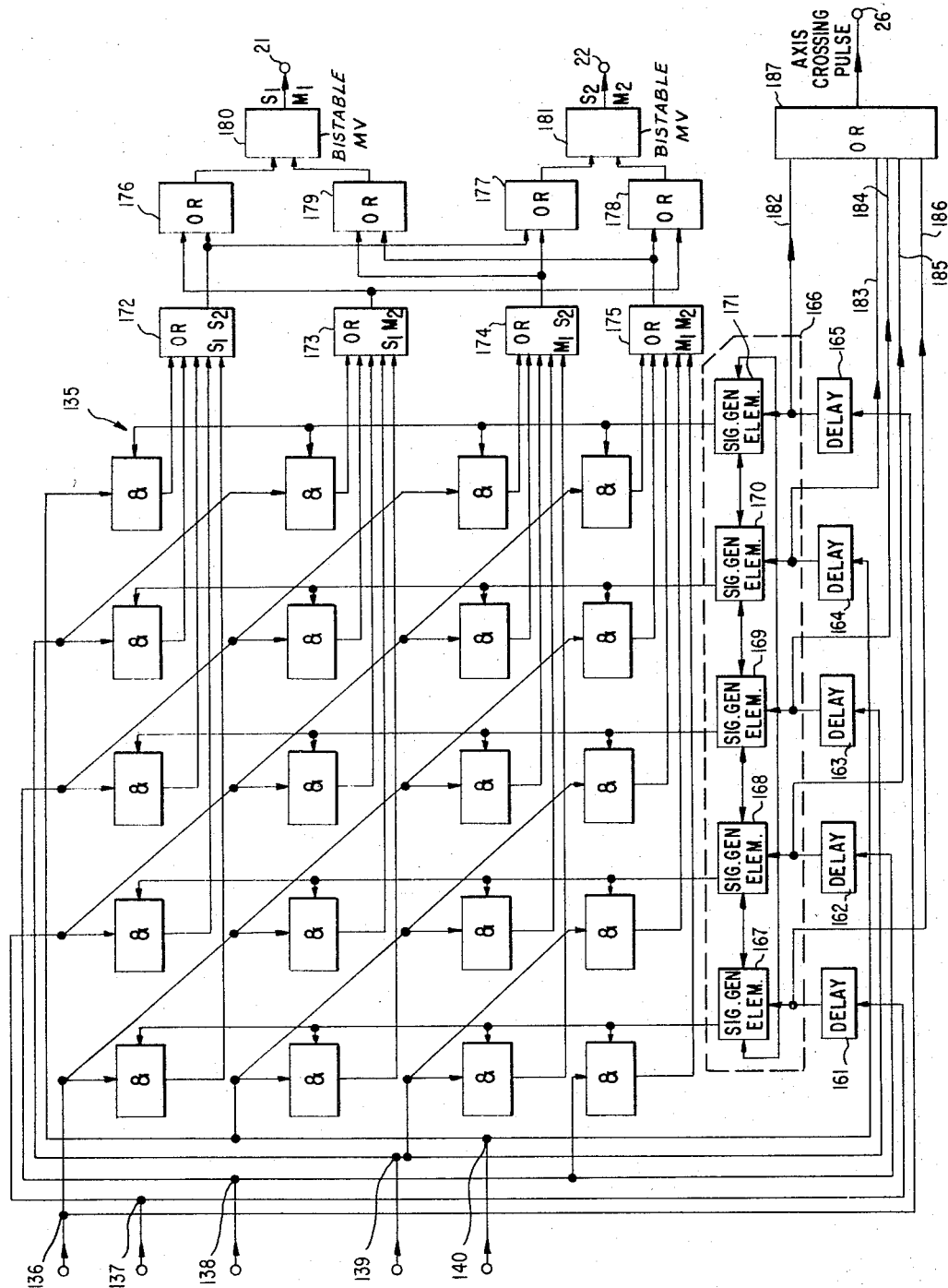
FIG. 5 is a logic and block diagram of the receiver resolving circuitry to convert data in four magnitudes of phase shift to a pair of binary signals.

FIGURES 4 and 5 illustrate reception and demodulation of such a wave. A suitable receiver is described in the above-mentioned patent application but is here illustrated with modifications to provide control signals for conversion from diplexed parallel signals at half-rate to a serial stream at the keying rate of the transmitter.

In FIG. 4 the incoming signal comprising the carrier frequency, e.g. 2400 c.p.s., is limited, differentiated, and clipped as indicated in block functions at 120, 121 and 122. Resulting unidirectional signals trigger and control the rate of signal generator 129 to produce an unmodulated signal at five times the frequency of the received signal, i.e., 12 kc. Generator 129 has an output equally synchronous with all of the transmitted phases. A dividing circuit 128, illustratively of the progressively-stepped ring type, requires five input pulses to complete a five step output cycle. AND gates 123, 124, 125, 126 and 127 are each supplied with the output of clipper 122 and are separately supplied with output each from a different one of the five signals from the frequency divider ring 128. Each such AND circuit has an output upon simultaneous inputs thereto in a conventional manner, and is connected to a rectifier, integrator and pulse shaper arrangement to provide output signals therefrom corresponding to the particular phases transmitted. Each of the outputs from the ring members A, B, C, D or E of the divider ring will contain a signal of the 2400 c.p.s. frequency of the incoming wave, without modulation. A scale of two flip-flop circuit 190 is connected to one of these outputs to supply the clock pulse at 1200 c.p.s.

Integration and shaping is provided in circuits generally indicated at 130, 131, 132, 133 and 134 for the outputs of the AND circuits with output leads 136, 137, 138, 139 and 140 going to the logic circuitry 135 of FIG. 5, comprising similar rows and columns of AND circuits similar to those employed in the transmitter, to provide at the receiver a determination of the magnitude of shift between one phase of transmission and the next succeeding phase. Pulses in lines 136–140 are individually fed to the diagonally-connected AND circuits of the logic circuitry, and to delay circuits 161, 162, 163, 164 and 165 which are each associated with one column of the logic matrix, in a well-known manner to provide output by rows at OR circuits 172–175, where each row is indicative of a different phase increment $\phi$, $2\phi$, $3\phi$ or $4\phi$ when the second AND input of the appropriate column is actuated. Delay circuits 161–165 have outputs to a signal generator 166 comprising generating elements 167, 168, 169, 170 and 171, associated individually therewith. The outputs of the signal generating elements 167–171 are taken severally to the columns of the logic matrix, element 167 thus responding to provide second input for AND circuits of that column in response to delayed arrival of the pulse from circuit 131 and ring output of the divider 128 as more fully described in the referenced application. OR circuits 176, 177, 178 and 179 are each connected to two of the OR circuits 172–175 as also described in the referenced application to provide a binary output by way of multivibrator 180 in response to signals in one pair of outputs 15, 16, 17 and 18 and from the remaining pair of outputs via multivibrator 181, illustratively shown as $S_1$ and $M_1$ and as $S_2$ and $M_2$, respectively.

In the following description of the processing and logic arrangement terminology is employed which is similar to terminology in the processing of two simultaneous data signals from different sources where the data transmissions in the two sources are simultaneous, as in the referenced application, now Patent No. 3,157,740. While the processing is essentially the same herein it should be recognized that $S_1$, $S_2$, $M_1$, $M_2$ represent binary signals pertinent to the particular stage of processing. Groupings change from stage to stage and $S_1$, $S_2$ may not represent the simultaneously applied pair of S signals present in two data inputs, since this invention accomplishes the simultaneous transmission of adjacently paired data bits from a single data stream. Instead they represent space and mark or 0 and 1 in a pair of derived data streams which overlap each other. Selection of an adjacent pair of signals for combining into a 600 b.p.s. space or mark could be a selection of adjacent 1200 b.p.s. mark-space signals comprising any of the four possible combinations. It will therefore be convenient merely for illustration purposes to consider $S_1$ and $S_2$, as space signals from series 1 and 2, whereas $M_1$ and $M_2$ may comprise mark signals from series 1 and 2. A positive data voltage value could be considered a mark and a negative (or zero) voltage as a space, also by way of illustration only. The designations at 171–175 and at 21, 22 of FIG. 5 are of different character. In 172 the logic presents combinations of space signals which were of an adjacent data bit pair at the 1200 b.p.s. rate, transmitted as one signal. The output at 21 is a data signal.

From delay circuits 161–165 an output is taken by way of lines 182, 183, 184, 185 and 186, respectively, to an OR circuit 187 such that a pulse is provided at the output of the OR circuit 187 whenever a pulse occurs on any of the lines 136–140, i.e., at 600 p.p.s. Obviously this "axis crossing pulse" might be derived from other points in the circuit with the same effect.

Figure 6:
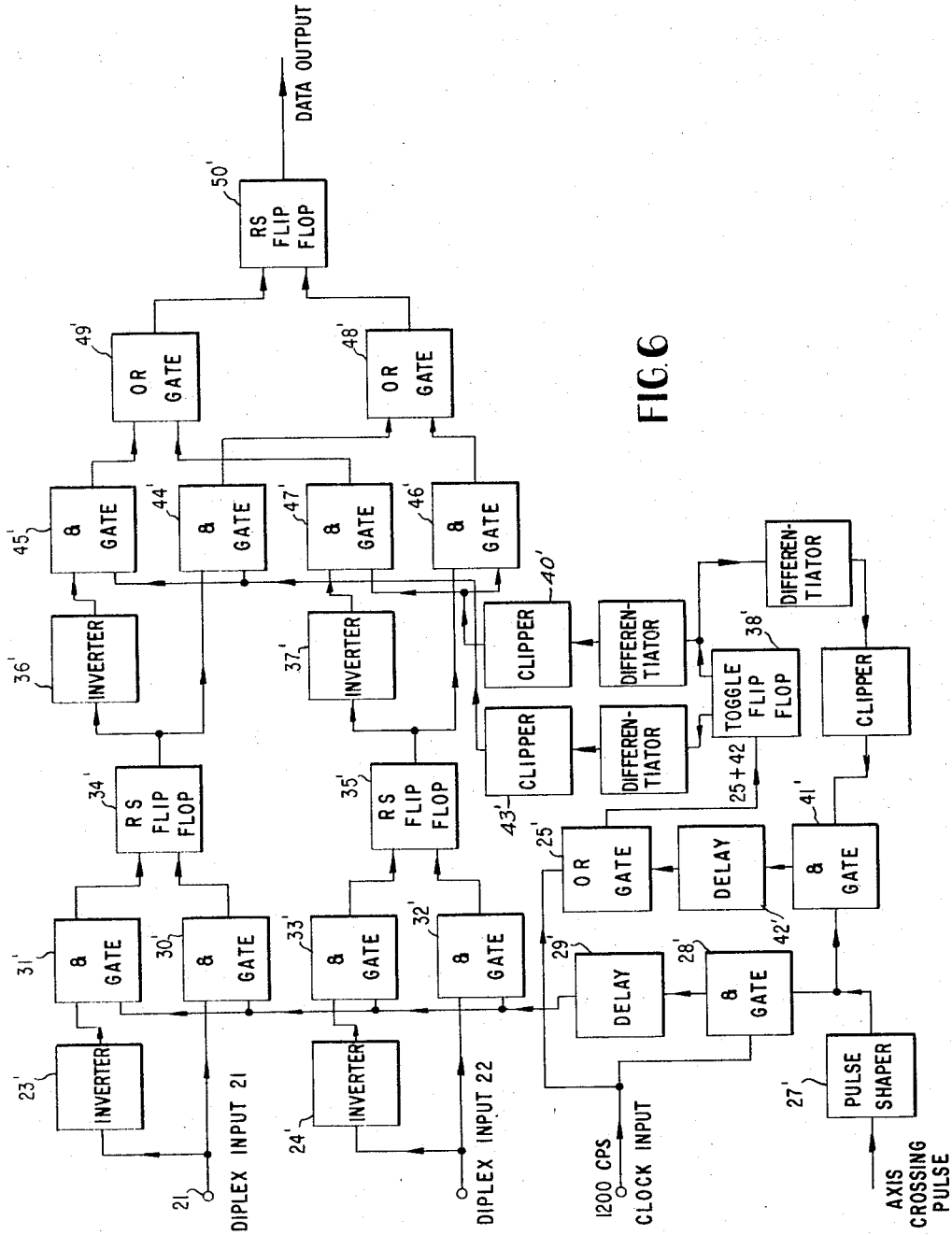
FIG. 6 is a block diagram of a circuit combining the pair of binary signals produced in FIG. 5 to form a serial stream of binary data constituted as in the transmitter data source.

Output from multivibrators 180 and 181 is taken to the circuitry of FIG. 6 for reconversion to a serial stream as diplex inputs 21, 22, respectively. Clock pulses from the flip-flop 190, FIG. 4, become the signal at 25, and the output of OR circuit 187, FIG. 5, becomes the axis crossing signal of FIG. 6 shown at 26 of FIG. 7.

The block diagram of FIG. 6 illustrates means for converting the two diplex outputs of a receiver for a four fold signal to a serial stream of binary data signals of the type previously described as modulating the transmitter. As in the case of the transmitter shown in FIG. 1, the signal receiving process according to FIG. 6 is represented in voltage-time graphs in FIG. 7 wherein the several lines are numbered to correspond to the output of the blocks of FIG. 6 therein labeled.

Figure 7:
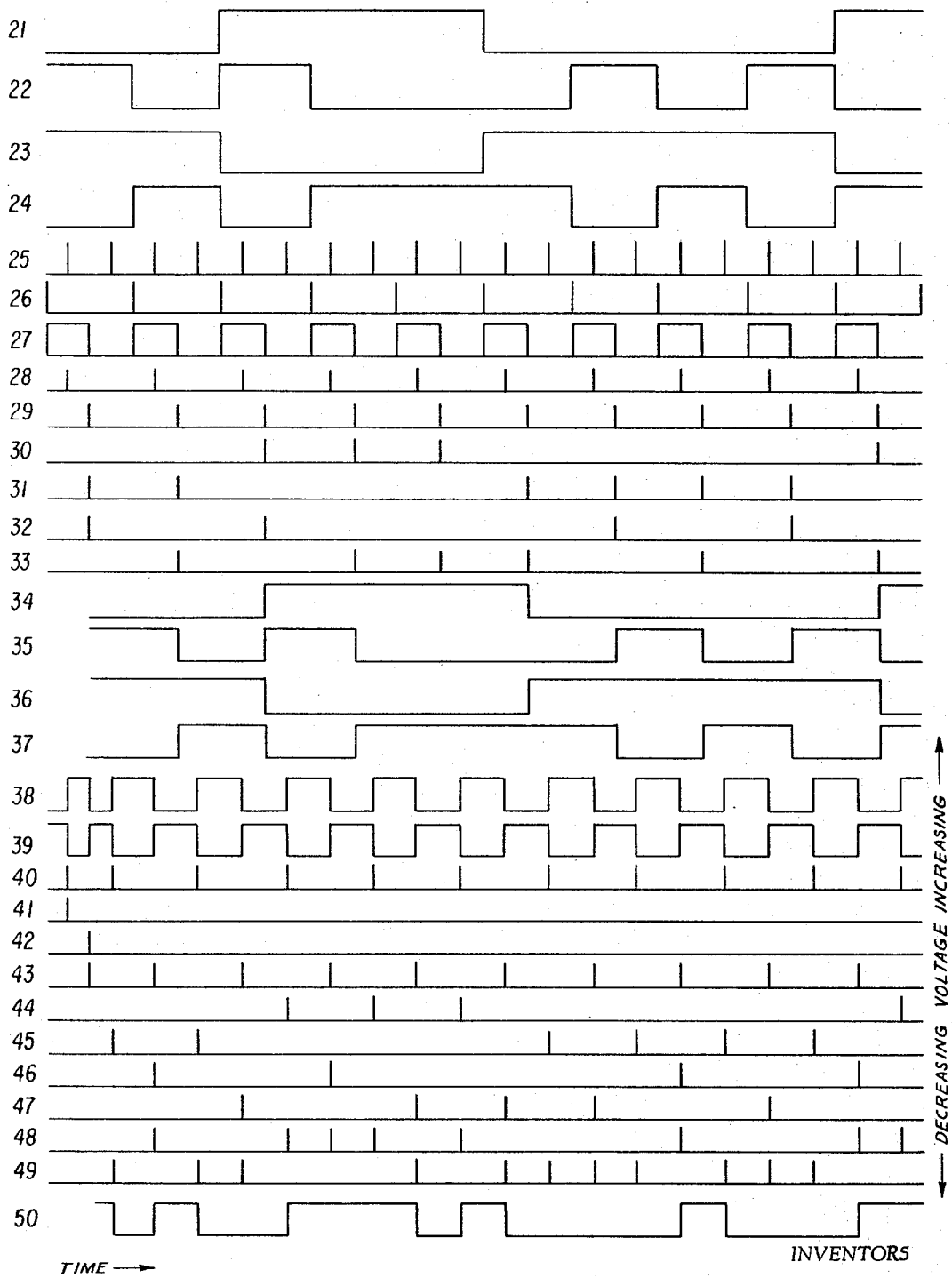
FIG. 7 is a voltage-time diagram for the receiver processing steps for combining the diplex signal into a serial data stream.

In FIG. 7, diplex signal inputs numbered 21 and 22 are shown in lines 21 and 22, in which the data transmitted is independent, but in which time of occurrence of phase shift has been synchronized. Lines 21 and 22 illustrate typical data streams recovered by the receiver apparatus shown in FIGS. 4 and 5 from a diplexed binary signal such as the four-fold signals described in connection with FIG. 1.

Processing of the data in the streams 21 and 22 is performed by a system of adding to the voltages there contained selected timing signals from a clock signal which may be separately received from the transmitter but is shown or developed at the receiver from the input signal. When the receiver clock pulse train is locally produced one may employ a frequency multiplying circuit within a receiver which produces a signal, having a frequency five times the frequency of a carrier wave when five distinct phases are employed, to produce a reference frequency free of phase modulation. Alternatively an incoming signal of 2400 c.p.s. might be employed directly to produce a 1200 c.p.s. clock pulse as illustrated at line 25 of FIG. 7. In the event that some other frequency is employed for the carrier wave which bears a harmonic relationship to the bit rate a multiple frequency developed from the carrier wave may be employed for recovering the clock signal of the selected bit rate. Likewise the recovered data signal in the diplex inputs 21 and 22 might also be employed by well-known techniques of differentiating, inverting and adding, to produce a clock pulse train at 1200 c.p.s. as illustrated at 25. However, axis crossing information is also desired, which is readily obtained by squaring and differentiating the input wave or some submultiple thereof. Alternatively the axis crossing information can be obtained from the OR gate 187 shown in FIG. 5. The timing pulses 25 are preferably offset one-half unit pulse length from those of line 26 for reasons similar to those for the offsetting described in connection with the transmitter.

At 23 and 24 in FIG. 7 there is shown the result of inverting by means of inverters 23' and 24' the signal trains shown in 21 and 22, respectively. The outputs at 23 and 24 form the first inputs for a set of AND gates 31' and 33', one from each of the inverters. The clock pulse train indicated at 25 is fed to an AND gate 28' which has a second input derived from the axis crossing pulse train 26. A pulse shaper indicated at 27' may consist of a single shot multivibrator or other means of producing a square pulse whose duration is preferably about one-half of the spacing between pulses 26, being thus of the approximate length of one unit pulse at the transmitter. The output 27 of the pulse shaper combines with the clock signal in gate 28' to produce the pulse train 28 which is coincident with alternate ones of the clock pulses 25.

A delay circuit 29' produces a pulse train 29 in response to input 28 and in which the stream of pulses 29 is approximately one unit pulse later in time than the pulse stream 26. Timing pulses 29 are then applied to a series of four AND gates 30', 31', 32' and 33'. Gates 30' and 32' have first input supplied directly from the diplex inputs 21 and 22, respectively. Gates 31' and 33' have similar but inverted input from lines 23 and 24, and each of the AND gates has a second input supplied from line 29. There results an output in each of the lines 30, 31, 32 and 33, of which lines 30 and 31 are complementary and lines 32 and 33 are likewise complementary. Thus each pulse of line 26 produces a positive output signal either in line 30 or 31 and another in line 32 or 33.

Two reset flip-flop circuits 34' and 35' are fed actuating signals from lines 30, 31, 32 and 33, in which one reset voltage for 34' comes from line 30 and for 35' comes from line 32. The opposite actuating signal in each case comes from the inputs indicated at lines 31 and 33, respectively. The reset flip-flop circuit outputs shown in lines 34 and 35 are seen to correspond to diplex inputs 21 and 22 except that each is delayed by one unit pulse length. Signal voltage pulse trains 34 and 35 are presented directly to a pair of AND gates 44' and 46', as in the case of AND gates 30' and 32'. These signals are also inverted to produce voltage sequences 36 and 37, corresponding, respectively, to the voltage signals in lines 23 and 24. The inverters 36' and 37' are similar to inverters 23' and 24' and serve as inputs for AND gates 45' and 47' similar to AND gates 31' and 33'. Thus a set of AND gates 44', 45', 46' and 47' are each supplied with an input corresponding, respectively, to signals 34, 34 inverted, 35 and 35 inverted, to produce outputs as in lines 44, 45, 46 and 47 whenever second inputs of these gates occur, supplied indirectly from the clock input signal and the axis crossing pulse train, as will be further described.

It will be recalled that the axis crossing pulse is at 600 c.p.s. corresponding to the keying rate and may be developed as positive pulses as in line 26, illustratively coincident with changes in the diplex signals developed from the received wave. These pulses are preferably extended to unit pulse length as by a one-shot multivibrator as indicated in line 27 and are employed in reconstructing the diplex signals shown in lines 34 and 35. The output of the pulse shaper 27' shown at 27 is taken also to AND gate 28' for the purpose of synchronizing the clock input with the data signal resolver which operates to derive the serial data stream from the reproduced diplex signals so that output data will not be inverted, later described. A clock signal at the 1200 c.p.s. rate, as shown at line 25, is taken by way of an OR gate indicated at 25' and then to a standard or toggle flip-flop 38' from which two oppositely phased pulses 38 and 39 are derived. The signal in line 38 is taken by way of a conventional differentiator and clipper circuit to supply the second input for AND gate 41' whence it serves to synchronize the clock pulse 40 and 43. The signal at line 38, when differentiated and clipped, produces gating pulses shown at line 40 corresponding to alternate actuations of flip-flop 38' which are illustrated as voltage increases in line 38. The inverted form of the signal 38 in line 39 is differentiated and clipped to provide gating pulses as shown in line 43 intermediate those of line 40. These two pulse trains 40 and 43 are used, respectively, for feeding second inputs to the four AND gates 44', 45', 46' and 47', having first inputs 34, 35, 36, and 37, to provide outputs 44, 45, 46 and 47. An output pulse is obtained in line 44 when AND gate 44' is supplied with positive input from line 34 and from line 43, while an output pulse occurs in line 45 at coincidence of positive pulses in 36 and 43. An output pulse in line 47 occurs whenever AND gate 47' has positive input 37 coinciding with an input 40, while line 46 has an output pulse when the AND gate 46' has positive input from lines 35 and 40.

It will be observed that output signals in lines 38 and 39 are fortuitously derived by toggle flip-flop action in response to pulses of line 25 and might become reversed with the result that the data output signal would be erroneous unless corrected. When the signal 38 is differentiated and clipped it may thus be incorrectly timed for addition to the appropriate one of the signals shown in lines 34 to 37. This ambiguity is resolved in the AND gate 41' to produce a pulse as in line 41, when the phase is incorrect, passing thence to a delay circuit 42' having an output as shown in line 42 about one-half unit pulse later. The output at 42 occurs only when the phase of pulses in line 38 is incorrect as indicated by coincidence of pulses 40 with the pulses in line 27. When this occurs the AND circuit operates to pass a single pulse shown on line 41 and to provide a delayed signal pulse as at line 42, which pulse is fed to the OR gate 25' thus to supply one additional clock signal to the toggle flip-flop, thereby to correct the polarity of signals in lines 38 and 39 within the first unit pulse time after the error occurs, being correct for the last portion of each 600 p.p.s. interval.

The pulses in lines 40 and 43 each occur at 600 p.p.s. but alternate between the two lines to form, when combined, a signal of 1200 p.p.s. Line 40 combines with line 34 to form line 44 and with line 36 to form line 45. Line 40 combines with line 35 to form line 46 and with line 37 to form line 47. These pulses shown in lines 44 through 47 are combined first to form pulse trains as in lines 48 and 49 and then the output shown in line 50. Lines 44 and 46 are combined in OR gate 48' to form pulse train 48, while lines 45 and 47 are combined in OR gate 49' to produce a pulse train as in line 49, which is complementary to the pulse train in line 48, to complete a 1200 p.p.s. signal. Pulse trains 48 and 49 are fed to a reset flip-flop circuit 50' to produce the desired data output 50. It will now be evident that the output signal in line 50 is identical in data content with, and of the form of, the input data stream 1 (or of stream 2 if desired) employed in the transmitter unit previously described.

Figure 2:
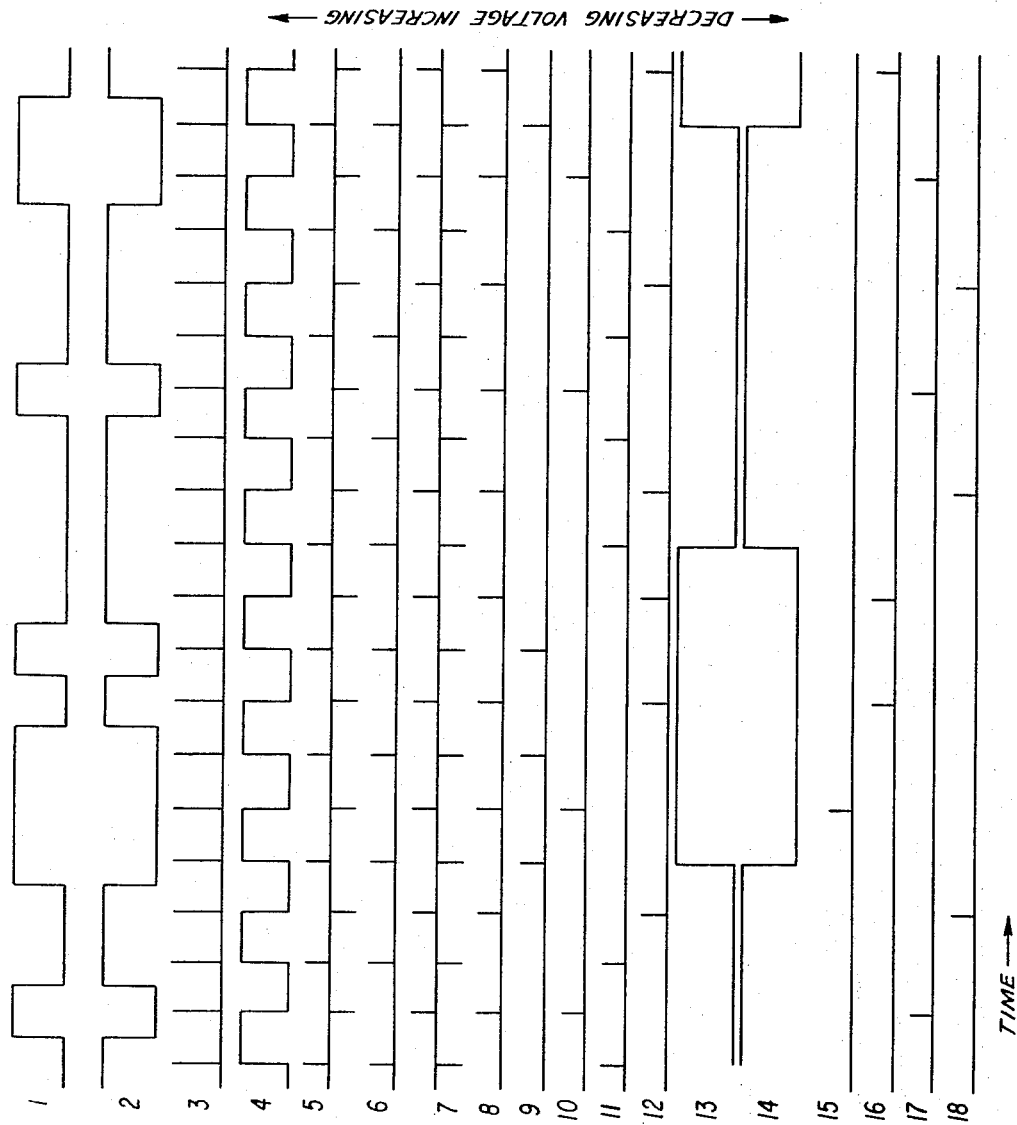
FIG. 2 is a voltage-time representation of the processing of the data input stream to produce diplexed output for keying the carrier wave at half the data bit rate.
Figure 8:
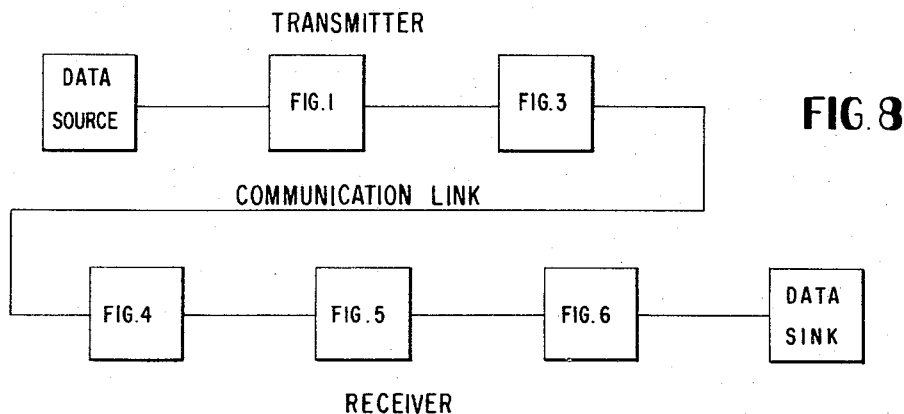
FIG. 8 is block diagram showing the arrangement of apparatus illustrated to form a complete signal processing system.

The serial-to-diplex modulation, demodulation and diplex-to-serial system is illustrated in its over-all organization in FIG. 8 where a serial data stream is diplexed before modulation as verying phase shift magnitudes by circuitry of FIG. 1 and FIG. 3, and transmitted, whence it is received by apparatus according to FIG. 4 and converted into phase shift magnitude information at the appropriate one of lines 136–140, and thereafter processed as in FIG. 5 to produce a pair of diplex inputs 21 and 22, a clock signal at 1200 c.p.s., and an axis crossing signal at 600 p.p.s. These pulses are then employed to convert the diplex inputs to a serial stream which passes to the data sink.

Figure 10:
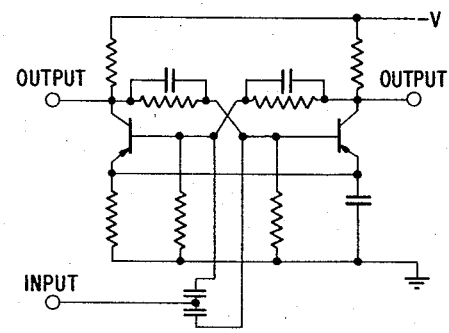
FIG. 10 illustrates a toggle flip-flop employable herein.
Figure 12:
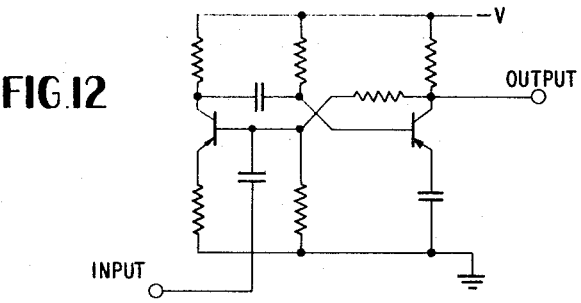
FIG. 12 illustrates a one-shot or delay multivibrator as indicated in the block diagrams.
Figure 11:
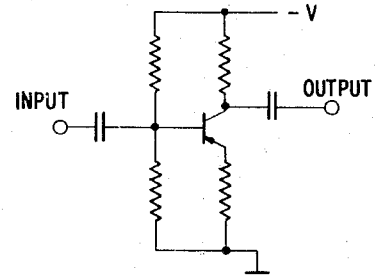
FIG. 11 illustrates one form of inverter employed in this invention.

FIG. 9 illustrates a reset flip-flop circuit having two input terminals and two output terminals to provide control from either output in accordance with latest source of signal of a given sign; FIG. 10 illustrates a standard flip-flop circuit actuated to the opposite output by a signal of one sign at a single input connection; FIG. 11 illustrates a signal inverter; and FIG. 12 illustrates a simplified one-shot or delay multivibrator, each as employed in prior figures.

While the present invention relates principally to the means of reducing the band width required for a 1200 b.p.s., or the like, signal to that nominally required for one-half that bit rate (600 b.p.s.), it will be evident that the same principle may be employed regardless of the choice of data rate, and is usable in multiplexed systems in which each channel might have a data rate such as 150 b.p.s. One example is to employ a bit rate of 150 b.p.s. on each of 16 channels multiplexed within the audio frequency band, to produce a total data rate of 2400 b.p.s.

What is claimed is:

1. A phase shift communication transmitter for non-synchronous operation wherein a single frequency carrier is transmitted in five discrete phases shifted according to a four level data signal, comprising
    means supplying a series of mark and space signals in the form of a serial binary signal train,
    means generating an inverted replica of said signal train,
    clock signal generating means having a repetition rate equal to the maximum rate of said mark and space signals,
    combining means operating to derive from said clock signal and said generated and supplied trains two simultaneous mark and space data signals of half said rate, of which a first includes the mark and space information at alternate clock signal intervals in said serial train and a second includes the remaining mark and space signals in said serial train,
    means operative to combine said simultaneous signals to produce phase shifts of said carrier at half said maximum rate in which each phase shift approximates an integral multiple of one-fifth cycle of the carrier, selected according to the four possible combinations of mark and space in said two channels, and
    transmitter output means in which said phase shift modulations are applied to said communication wave as a four level signal.

2. A transmitter according to claim 1 wherein said means generating and supplying the binary signal trains have ouput portions which are passed to a pair of AND gates and portions which are inverted and fed to a second pair of AND gates, each as a first input thereto, means selecting alternate pulses from said clock signal to form two pulse trains each at half said repetition rate, means causing one said half rate pulse train to be inverted with respect to the other said half rate pulse train, means applying one of said half rate pulse trains to the first and third of said AND gates, and means supplying the second said half rate pulse train to the second and fourth said AND gates as the second inputs thereto, respectively, and means deriving from said AND gates an output on each of four lines wherein each corresponds to one of the possible combinations of input to said AND gates.

3. A transmitter according to claim 2 wherein last said means comprises a reset flip-flop circuit alternately responsive to said first and third AND gates to produce first and second output signals therefrom being of opposite polarity at any instant, and a set of four AND gates whereof the first and second are responsive to said first output signal and the third and fourth to said second output signal, means responsive to said second and fourth AND gates of the first named set supplying second input to said second set of AND gates, and output means connected one to each of said second set of AND gates to provide output from one of last said gates during each successive interval corresponding to half rate of the clock signal.

4. A transmitter according to claim 1, said means operative to produce said modulations including means generating from said clock pulses a carrier wave of double the frequency of said pulses and means effective to select from said carrier five equally spaced carrier phases each couplable to a common output and means including logic circuitry connected to said combining means for selecting one of said phases during each said half rate interval which differs from the proceeding phase of output in accordance with one of said four degrees of modulation.

5. A communication transmitter according to claim 1 wherein said single frequency carrier is a harmonic of said clock signal.

6. In a communication transmitter wherein a single frequency carrier is transmitted in differing degrees of phase modulation corresponding to a four level data signal, in combination
    means supplying a series of binary data signals at a fixed rate,
    means producing regular clock pulses at said rate,
    means producing from said data signals an inverted series of binary data signals coincident therewith,
    means producing from said clock pulses first and second clock signal trains each at half rate and alternating therebetween in timing,
    first gating means including AND gate elements operative at said half rate to produce four outputs of which the first output denotes coincidence between said data signals of one sign and pulses of said first clock train, the second denotes coincidence between data signals of said sign and pulses of said second clock train, the third denotes coincidence between data signals of said inverted series and pulses of said first clock train and the fourth denotes coincidence between data signals of said inverted series and pulses of said second clock train, and
    means combining said four outputs to provide signals on four lines, whereof those occurring on lines 1 and 3 are derived from data signals of one sign in the first-named series of binary signals and those occurring on lines 2 and 4 are derived from data signals of said one sign in said inverted series, said combining means further including means to cause signals derived from said data signals of said first series to appear on said line 1 when the data bit represented thereby is a repeated signal of the same sign as the previous adjacent signal in said first series of binary data signals, and one said line 4 when the data bit represented thereby is a repeated signal of the same sign as the previous adjacent signal in said inverted series, signals on said third line and said second line representing data signals which are of opposite signs to the adjacent prior signal in said first series on said inverted series, respectively.

7. In a transmitter according to claim 6 said combining means comprising
a reset flip-flop circuit connected to first and third of said AND gate elements to produce therefrom first and second combined outputs alternating in time,
a second set of AND gates comprising first and second members connected to receive said first combined output and third and fourth members thereof connected to receive said second combined output,
means connecting the second element of said first AND gate means as an input to the first and third of said second set of AND gate members,
means connecting the fourth element of said first AND gate means as an input to said second and fourth members of said second set, and
ouput means comprising separate connections to each of said four members of said second set individually responsive to coincidence inputs to said members of said second set.

8. A transmitter according to claim 6 including
means developing a carrier wave synchronous with said clock signals and double the frequency thereof,
logic means responsive to said output in said four lines for selecting a phase of transmission which is shifted at said half rate by an amount being a simple first, second, third or fourth multiple of one fifth cycle of said doubled frequency, according to which of said output lines contains the instantaneous output from said AND gates.

9. In a communication receiver adapted to produce a pair of simultaneous output signals each of continuous binary form at a fixed repetition rate and representative of diplex signals from a source of transmission, a parallel-to-series converter comprising
means developing from said signals a series of clock signals at double said rate,
means developing from said signals a series of axis crossing pulses at said rate,
means combining said clock signals and said pulses to produce a first combined signal at said rate,
means combining said clock signals and said pulses to produce a second combined signal at said rate each midway between adjacent signals of said first combined signal,
means responsive to said combined clock and axis crossing signals for inverting the sign of output of said means to produce said second combined signal in response to a predetermined timing thereof to alter the sign of adding alternate signals in said serial stream,
means selecting separately mark and space signals from each of said pair of simultaneous signals which correspond to pulses of said first combined signal,
means selecting separately mark and space signals from each of said pair of signals which correspond to pulses of said second combined signal, and
means combining said selected signals in a serial stream.

10. The method of transmitting binary data by modulation of a carrier wave within a band width less than the bit rate for said data which comprises
generating a carrier wave,
generating a serial binary data stream at said rate,
converting said serial stream to two parallel binary streams at half said rate whereof each half rate bit is overlappingly contemporaneous with two adjacent bits of the other said half rate stream,
combining said half rate streams to produce at four output terminals an output each representing a different summed result of the two parallel binary streams, and
transmitting said carrier wave in four discrete magnitudes of phase shift modulation each an integral multiple of one-fifth cycle by selecting phases to produce modulation steps at said half rate each step corresponding to one of said results instantly summed.

11. The method of reproducing a serial stream of binary data at a predetermined rate from a four level modulation at half said rate of a carrier wave of frequency which is a simple multiple of said rate, comprising
receiving said wave,
developing from said wave a first clock signal pulse train at said rate,
developing from said wave a second pulse train at half said rate and a third pulse train at half rate between pulses of said second pulse train,
developing from said received wave a pair of parallel binary signals each representing two conditions of said four level modulation,
developing from said pair of binary signals inverted polarities thereof,
summing said pairs of parallel and inverted binary signals at times determined by said third train pulses to produce binary replicas of said parallel and inverted binary signals each delayed by one interval of said clock train,
combining said pairs of binary signals and said replicas thereof at times gated by said clock signal to produce a single binary output stream at said rate wherein each bit is composed of information in the second half rate portion of one said signal and the first portion of the other said signal of said pair of parallel binary signals.

12. The method of claim 11 wherein said combining includes advancing said gating by said clock signal in response to a signal developed during said combining corresponding to polarity inversion of one of said signals combined.

13. In a system for communicating by phase shifting a single frequency carrier wave at alternate bit intervals selected from a binary data stream of fixed rate wherein the carrier frequency is a harmonic of said rate and said phase shifts occur at half said rate the combination, comprising
means transmitting and receiving said phase shifted carrier,
receiver means for demodulating said phase shifted wave to form data signals of four kinds indicative of the phase shifts of carrier occurring one at a time in successive alternate bit intervals corresponding to said binary data rate,
means deriving from the received waves a stream of pulses at said fixed rate,
means separating from the received wave pulses at half said rate,
means developing a square wave recurrent at intervals corresponding to pulses at said half rate,
means responsive to positive and negative excursions, respectively, of said square wave for enabling first and second pairs of output gates,
first and second pairs of output AND gates connected respectively to pass said four kinds of data signals when enabled,
output means including a flip-flop circuit connected to convert signals from said AND gates to a serial data stream, and
means responsive to pulses at said rate and at said half rate for adjusting the timing of enabling signals causing said AND gates to respond to said four data signals.

14. In a system of communication of bits of data in binary form over a communication link, a transmitter comprising
means producing a wave comprising a single square wave portion of varying length proportional to a number of adjacently occurring mark signals for a data stream and a single square wave portion of varying length of opposite sign to represent adjacent space signals of said stream, for each transition from space-to-mark and mark-to-space, respectively, means producing an inverted replica of said wave, means producing regular unidirectional pulses constituting a clock pulse chain at the maximum bit rate for the system, means producing unidirectional pulses of one sign for alternate members of said pulse chain and unidirectional pulses of opposite sign for the other members of said train, means determining first coincidences between said unidirectional pulses of one sign and portions of said wave of the same sign, means determining second coincidences between said unidirectional pulses of opposite sign and portions of said inverted replica having said opposite sign, means generating square wave portions of positive sign for said first coincidences extending in time to the next succeeding said second coincidence and portions of negative sign for second coincidences extending to the next succeeding said first coincidence, and means converting last said square wave portions of positive and negative sign into degrees of modulation of a fixed frequency carrier wave for transmission, wherein positive portions are of two degrees of modulation corresponding to which of said alternate members of the pulse train is instantly therein included and said negative portions comprise two further degrees of modulation corresponding to which alternative members of said pulse train of opposite sign are therein included.

References Cited

UNITED STATES PATENTS

| | | | |
|---|---|---|---|
| 2,977,417 | 3/1961 | Doelz | 178—66 X |
| 3,128,342 | 4/1964 | Baker | 178—66 |
| 3,128,343 | 4/1964 | Baker | 178—67 |
| 3,157,740 | 11/1964 | Crafts | 178—66 |

JOHN W. CALDWELL, *Acting Primary Examiner.*

DAVID G. REDINBAUGH, *Examiner.*

S. J. GLASSMAN, W. FROMMER, *Assistant Examiners.*